April 16, 1935.   G. D. PEET   1,998,250
METHOD AND APPARATUS FOR SUPPLYING GAS
Filed March 2, 1932
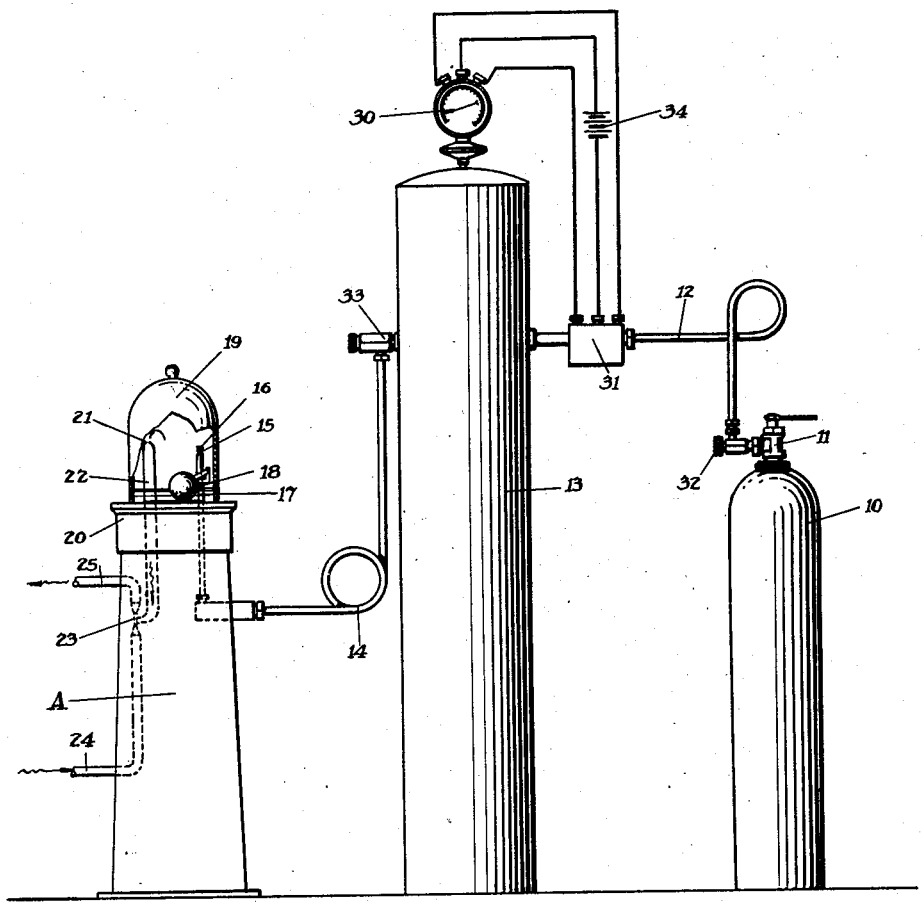
INVENTOR
BY Gerald D. Peet
Arthur L. Kent
ATTORNEY Patented Apr. 16, 1935

1,998,250

UNITED STATES PATENT OFFICE 1,998,250

METHOD AND APPARATUS FOR SUPPLYING GAS

Gerald D. Peet, Montclair, N. J., assignor to Wallace & Tiernan Company, Inc., Belleville, N. J., a corporation of New York Application March 2, 1932, Serial No. 596,309

8 Claims. (Cl. 210—28)

This invention relates to a method and apparatus for supplying chlorine gas at a controlled rate, and the object of the invention is to prevent liquefaction in the gas supply apparatus and thereby to avoid the difficulties which result therefrom. In supplying a controlled flow of chlorine gas obtained from cylinders of compressed liquefied chlorine for treating water and for other purposes, much trouble has been caused by the deposit of various substances on parts of the control apparatus resulting from liquefaction of the chlorine gas after leaving the supply container and subsequent vaporization.

The pressure at which chlorine gas liquefies varies widely with the temperature. At 32° F. the gas liquefies at slightly over 50 pounds absolute pressure, while at 95° F. substantially 150 pounds pressure is required to liquefy chlorine gas. Chlorine is usually supplied for use compressed to the liquid state in closed containers from which it is permitted to escape as gas through supply apparatus comprising pressure-reducing and flow-controlling means whereby the gas is supplied at the desired flow rate and pressure, the pressure ordinarily being substantially atmospheric pressure or a few pounds above atmosphere, usually not more than about 25 pounds gage. In the use of chlorine for the treatment of flowing water for the purpose of sterilizing the water, the amount of chlorine used or rate of flow of the chlorine gas is frequently very small so that the control of the gas flow involves the use of small flow orifices, such as pressure reducing valve openings and fixed flow-controlling orifices. It is extremely important for the proper functioning of the supply apparatus that these small openings shall not become clogged or stopped by the deposit of impurities from the flowing gas. Deposit at the valves may affect the operation of the valve or entirely stop the flow, and deposit at a fixed flow-controlling orifice reduces the size of the orifice and affects the rate of flow.

The liquid chlorine containers are commonly provided with a shut-off valve which when chlorine is being used is fully opened, and the chlorine gas flows through a metal pipe or tube to the pressure reducing valve, or the first pressure reducing valve, of the control apparatus. The pressure in this connecting tube from the liquid chlorine container to the pressure reducing and regulating valve is substantially the container pressure, that is, the vapor pressure of the gas at whatever its temperature may be. Beyond the reducing valve the gas pressure is much less, the exact pressure varying according to the setting of the valve. It frequently happens that because of a reduction of temperature of the gas in the tube between the liquid container and the pressure reducing valve there will be a liquefaction of some of the gas in this tube. This liquid will then pass on to the pressure reducing valve and by the pressure reduction at the valve will be changed back to gaseous chlorine. This change of the chlorine from the liquid to the gaseous state has been the cause of much difficulty resulting from the deposit of gummy substances at the reducing valve orifice and at other flow-controlling orifices in the gas line. Certain substances which are frequently present in the chlorine, such as hexachlorethane and copper and iron chlorides are soluble in liquid chlorine but are insoluble in gaseous chlorine and, consequently, do not volatilize with the chlorine, and these substances are deposited when the liquid chlorine is changed to gaseous chlorine, and the places of deposit of such substances, which are usually of a gummy nature, is mostly at the valve orifices and other flow-controlling orifices in the flow line. Other materials are mechanically entrained in liquid chlorine but are deposited when the liquid changes to gas, and these materials aid in clogging or closing the orifices or affecting the operation of the pressure reducing valve.

It is highly important, therefore, to avoid any liquefaction of chlorine gas in the supply line leading from the liquid chlorine container to and through the control apparatus to the place of final discharge of the gas. Such liquefaction is avoided in accordance with the present invention by maintaining between the liquid chlorine container and the reducing valve a supply of chlorine gas in a storage tank or reservoir at a pressure below that at which the gas will liquefy at any temperature to which it is liable to be subjected either in such gas reservoir or at any point in its flow through the control apparatus. The pressure in this gas reservoir must be sufficient to meet the requirements of the pressure reducing valve for its operation to supply the gas at the desired reduced pressure, and the supply of gas to the reservoir will need to be replenished from time to time as required to maintain the pressure therein between a predetermined maximum and a predetermined minimum. For controlling the supply of gas to this reservoir a filling valve is provided between the liquid chlorine container and the gas reservoir which may be operated manually or automatically to permit gas to pass into the reservoir at suitable intervals. The maximum pressure to which the reservoir is filled will vary according to climatic and seasonal conditions. For some places and seasons an absolute pressure of from 75 to 80 pounds in the gas reservoir is safe. For others, the maximum pressure should be lower. The minimum pressure to be permitted in the reservoir will depend on the pressure at which the gas is to be delivered by the pressure reducing valve.

A full understanding of the invention can best be given by a detailed description in connection with the accompanying drawing which shows diagrammatically an illustrative form of apparatus for practicing the method and embodying the apparatus features of the invention.

The drawing shows a flow-controlling apparatus A to which chlorine gas is supplied from a cylinder 10 containing liquid chlorine, from the top of which, when the apparatus is in use, chlorine is permitted to escape as a gas through a shut-off valve 11 to flow through a tube 12, a storage tank or reservoir 13 and tube 14 to a pressure-reducing and regulating valve 15 of the control apparatus.

The flow-controlling apparatus may be of any kind suitable for reducing the pressure of gas drawn from a supply at relatively high pressure and supplying the gas for use at a desired rate. It may be a pressure supply apparatus for supplying the gas at a suitable pressure, usually only a few pounds above atmosphere, or it may be of the type which supplies the gas at atmospheric or sub-atmospheric pressure. The drawing shows more or less conventionally the principal parts of a control apparatus of the latter type of the kind shown and fully described in a patent of Wallace, No. 1,514,939. This apparatus comprises a pressure reducing valve 15 formed by a needle valve 16 which co-acts with an orifice in the end of a gas tube 17 and is controlled by a float 18 to maintain a constant substantially atmospheric gas pressure within the bell jar 19. The bell jar is set in a water tray 20 so that water from the tray may enter the jar, and the water rises and falls in the jar according to the pressure within the jar. When the pressure in the jar drops below the desired constant pressure, the water level within the jar rises and the float 18 rises and opens the valve 16, and when by inflow of gas past the valve the pressure under the jar rises above the desired pressure, the water level is depressed and the float drops and closes the valve. The gas thus maintained at constant pressure in the bell jar passes from the jar through a flow-controlling orifice 21 into a tube 22 which connects to the throat of a water aspirator 23 to which water is supplied through a pipe 24 and from which the water passes on through a discharge pipe 25. Gas is thus sucked through the pipe 22 by the aspirator and mixes with the water flowing through the aspirator and is discharged with the water through the pipe 25 to the place of application or use. This particular control apparatus is fully described in said Wallace patent and need not be further described here as the particular construction of the control apparatus is, as stated, no part of the present invention.

The storage reservoir or tank 13 may be of any suitable construction and of any suitable size. There being no liquid in the tank, an increase in temperature will not cause any considerable increase in pressure. There is no danger of such increase in pressure as might occur if the tank contained chlorine as a liquid. As to the size of the tank, I have found it convenient to use a tank 15" in diameter by 80" in height for small sterilizing installations. Such a tank will hold 5 pounds of chlorine at about 48 pounds gage pressure, and one filling of such a tank will thus do for treating about 100,000 gallons a day of ordinarily good water for 25 days, so that refilling the tank every three weeks is sufficient.

The tank is provided with a pressure gage 30 and with a filling valve 31 to which the tube 12 leading from the liquid chlorine cylinder 10 is connected. The cylinder 10 is shown as provided with the usual cylinder shut-off valve 32. The tube 14 leading from the tank to the inlet tube 17 of the control apparatus is most desirably connected to the tank through a shut-off valve 33 for closing the outflow from the tank when desired, as when the tank is disconnected from the control apparatus. The filling valve 31 may be, as shown, an automatic valve controlled by the pressure in the storage tank to open at a predetermined minimum tank pressure to permit gas to flow from the cylinder 10 into the tank and to close at a predetermined maximum tank pressure. This automatic valve may be of known construction operated electrically, and the pressure gage may be a pressure contact gage of known construction for suitably controlling the operation of the automatic valve through a three-wire connection as indicated in the drawing, including a battery 34 or other suitable source of current.

With this arrangement, the cylinder valve 32 and the tank outlet valve 33 being open, a supply of gas will be maintained under suitable pressure in the reservoir 13 for supplying the control apparatus for continued operation so long as there is available a supply of chlorine under suitable pressure for refilling the tank through the filling valve 31. Fresh cylinders of liquid chlorine may obviously be connected to the supply tube 12 from time to time when the valve 32 is closed.

When the valve 31 is manually operated, the reservoir 13 should desirably be as large as convenient so as to lengthen the periods between refilling operations, but when the filling valve is automatically operated, a much smaller tank will serve all requirements for an installation of the same size. The controlling consideration is that the refilling of the tank or reservoir shall be intermittent or from time to time and the tank of such capacity that at each filling operation a considerable amount of gas shall pass into the tank, thereby avoiding the necessity of using a filling valve having any very small orifice which might be liable to become clogged. As the gas must flow into the reservoir 13 at a rate which is high as compared to the rate at which the gas is supplied from the reservoir, the filling valve orifice will obviously be large as compared to the orifices which control the flow from the reservoir. When an automatic filling valve is not provided, a separate filling valve in addition to the cylinder valve 32 is not absolutely necessary since the cylinder valve may serve as the filling valve. Preferably, however, even for manual operation, a separate filling valve is provided.

What is claimed is:

1. The method of supplying chlorine gas, which comprises permitting the gas to pass from a container of liquefied chlorine into a second closed container through a normally closed connecting passage at a flow rate which is high as compared to the rate at which the gas is to be supplied, shutting off the flow of gas from the first container before the gas pressure in the second container reaches that at which the gas will liquefy at temperatures to be encountered by the gas, and supplying gas from the second container and controlling the flow of gas therefrom by means including a pressure reducing and automatically regulating valve, the period during which the gas is permitted to pass into the second container being relatively short and the period during which the connecting passage between the containers remains closed being relatively long.

2. The method of supplying chlorine gas, which comprises permitting the gas to pass from a container of liquefied chlorine into a second closed container through a normally closed connecting passage, shutting off the flow of gas from the first container before the gas pressure in the second container reaches that at which the gas will liquefy at temperatures to be encountered by the gas, supplying gas from the second container and controlling the flow of gas therefrom by means including a pressure reducing and automatically regulating valve, and maintaining a supply of gas in the second container at a pressure varying within a range the upper limit of which is a relatively high pressure below that at which the gas will liquefy at temperatures to be encountered by the gas and the lower limit of which is a relatively low pressure above the pressure at which the gas is to be supplied, by from time to time permitting more gas to pass from the first container to the second container at a flow rate which is high as compared to the rate at which the gas flows from the second container.

3. The method of supplying chlorine gas, which comprises permitting the gas to pass at intervals from a container of liquefied chlorine into a second closed container through a normally closed connecting passage at a flow rate which is high as compared to the rate at which the gas is to be supplied, the period during which such connecting passage is open being relatively short and the period during which it is closed being relatively long, limiting the gas pressure in said second container to a pressure less than that at which the gas will liquefy at the temperatures to be encountered by the gas, and supplying gas at a reduced pressure from the said second container through pressure reducing and automatically regulating and flow-controlling means.

4. The method of supplying chlorine gas at a controlled rate from a container of liquefied chlorine, which comprises maintaining in a second closed container a supply of said gas at a pressure varying within a range the upper limit of which is below the pressure at which the gas will liquefy at temperatures to be encountered by the gas and the lower limit of which is above the pressure at which the gas is to leave the pressure reducing and regulating means by permitting gas to pass at intervals into the second container from the first container at a flow rate which is high as compared to the rate at which the gas is to be supplied, and supplying gas from the second container through pressure reducing and automatically regulating and flow-controlling means.

5. Apparatus for supplying chlorine gas at a controlled rate from a container of liquefied chlorine, comprising a supply line leading from the container, an automatically acting pressure reducing and regulating valve in said line, flow-controlling means beyond said valve, a variable pressure storage reservoir connected in said line between said container and the said pressure reducing and regulating valve, and a normally closed shut-off filling valve between the container and said storage reservoir adapted when open to permit gas to flow to the reservoir at a rate which is high as compared to the rate at which the gas flows from the reservoir to fill the reservoir to a relatively high pressure in a relatively short period of time, the period required for the same amount of gas to flow from the reservoir through said pressure reducing and regulating valve being relatively long.

6. Apparatus for supplying chlorine gas at a controlled rate from a container of liquefied chlorine, comprising a supply line leading from the container, an automatically acting pressure reducing and regulating valve in said line, flow-controlling means beyond said valve, a variable pressure storage reservoir connected in said line between said container and the said pressure reducing and regulating valve, a normally closed shut-off filling valve between the container and said storage reservoir adapted when open to permit gas to flow to the reservoir at a rate which is high as compared to the rate at which the gas flows from the reservoir, and pressure operated means controlled by the pressure in said storage reservoir for opening the filling valve for a relatively short period when the pressure in said storage reservoir drops to a predetermined minimum pressure and for closing said valve for a relatively long period when the pressure in the storage reservoir rises to a predetermined maximum pressure which is substantially greater than said minimum pressure but less than that at which the gas will liquefy at temperatures to be encountered by the gas before passing said pressure reducing valve.

7. Apparatus for supplying chlorine gas at a controlled rate from a container of liquefied chlorine, comprising a supply line leading from the container, an automatically acting pressure reducing and regulating valve in said line, flow-controlling means beyond said valve, a variable pressure storage reservoir connected in said line between said container and the said pressure reducing and regulating valve, and a normally closed manually operated filling valve between the container and said storage reservoir adapted when open to permit gas to flow to the reservoir at a rate which is high as compared to the rate at which the gas flows from the reservoir to fill the reservoir to a relatively high pressure in a relatively short period of time, the period required for the same amount of gas to flow from the reservoir through said pressure reducing and regulating valve being relatively long.

8. Apparatus for supplying chlorine gas at a controlled rate from a container of liquefied chlorine, comprising a variable pressure storage reservoir, means for withdrawing gas from said container into said reservoir at intervals at a relatively high rate and for a relatively short period, and means for supplying gas at a relatively low rate and for a relatively long period from said reservoir comprising flow-controlling apparatus including an automatically acting pressure reducing and regulating valve.

GERALD D. PEET.